United States Patent
Hug et al.

(10) Patent No.: US 7,721,111 B2
(45) Date of Patent: May 18, 2010

(54) AUTO-NEGOTIATION OF CONTENT OUTPUT FORMATS USING A SECURE COMPONENT MODEL

(75) Inventors: Joshua D. Hug, Seattle, WA (US); Xiaodong Fu, Herndon, VA (US)

(73) Assignee: RealNetworks, Inc., Seattle, WA (US)

( * ) Notice: Subject to any disclaimer, the term of this patent is extended or adjusted under 35 U.S.C. 154(b) by 627 days.

(21) Appl. No.: 10/736,219

(22) Filed: Dec. 14, 2003

(65) Prior Publication Data
US 2005/0132208 A1 Jun. 16, 2005

(51) Int. Cl.
*G06F 21/00* (2006.01)
*G06F 11/30* (2006.01)
(52) U.S. Cl. .................................................. 713/189
(58) Field of Classification Search .................. 713/189
See application file for complete search history.

(56) References Cited

U.S. PATENT DOCUMENTS

| | | | |
|---|---|---|---|
| 6,407,680 B1 * | 6/2002 | Lai et al. | 341/50 |
| 6,807,668 B2 | 10/2004 | Stern et al. | |
| 7,039,048 B1 * | 5/2006 | Monta et al. | 370/389 |
| 2002/0049679 A1 * | 4/2002 | Russell et al. | 705/52 |
| 2003/0126086 A1 * | 7/2003 | Safadi | 705/51 |
| 2004/0139233 A1 * | 7/2004 | Kellerman et al. | 709/246 |
| 2005/0097361 A1 * | 5/2005 | Apostolopoulos et al. | 713/201 |

OTHER PUBLICATIONS

Interoperable Protection for Digital Multimedia Content Bart J Van Rijnsoever, Peter Lenoir and Jean-Paul M.G. Linnartz Apr. 17, 2001.*
http://www.webopedia.com/TERM/T/transcoding.html, Definition of "transcoding."*
Definition of "transcoding" from Webopedia, Dec. 2001.*

* cited by examiner

*Primary Examiner*—Christian LaForgia
*Assistant Examiner*—Harris C Wang
(74) *Attorney, Agent, or Firm*—AXIOS Law; Adam L. K. Philipp (57) ABSTRACT

In accordance with one embodiment of the present invention, secure content objects are transcoded from an input format to an output format based upon identified capabilities of a receiving device. In one embodiment, a plurality of trusted processing components are identified to collectively transcode the secure content object from the identified input format to the determined output format. In one embodiment, each of the trusted processing components are authenticated prior to operating on the secure content object.

40 Claims, 5 Drawing Sheets

AUTO-NEGOTIATION OF CONTENT OUTPUT FORMATS USING A SECURE COMPONENT MODEL

FIELD OF THE INVENTION

Embodiments of the present invention relate to the field of digital rights management.

BACKGROUND OF THE INVENTION

Electronic content can include a wide variety of audio and/or video presentations, such as music, dialogue, still pictures, movies, and the like. With the proliferation of portable playback devices on the market, which are capable of storing and rendering near-identical copies of original audio and/or video content, coupled with the distribution capabilities of the Internet, digital rights enforcement of audio and/or video content has become an increasingly important concern for digital content providers.

Likewise, due to the portability and extremely high playback quality afforded by digital playback devices, consumer adoption of such devices has skyrocketed in recent years. However, given the wide variety of digital playback devices on the market it is not always evident what a given device's capabilities are when it comes to content playback. For example, a first family of playback devices may support play back of digital content encoded with a first encoding/decoding algorithm (CODEC) and encryption algorithm, which might not be supported by a second family of playback devices.

Currently, consumers who wish to transfer secure content (that is content that has been protected by a digital rights management system or "DRM") to a playback device, are limited by both the type of device the content can be transferred to, as well as the operations that the playback device is allowed to perform on the content. Accordingly, a simplified mechanism for transferring secure content to playback devices is desired.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF EMBODIMENTS OF THE INVENTION

In accordance with one embodiment of the present invention, secure content objects are transcoded from an input format to an output format based upon identified capabilities of a destination device. In one embodiment, a plurality of trusted processing components are identified to collectively transcode the secure content object from the identified input format to the determined output format securely. In one embodiment, each of the trusted processing components are authenticated prior to their operation on the secure content object.

In the description to follow, various aspects of the present invention will be described, and specific configurations will be set forth. However, the present invention may be practiced with only some or all aspects, and/or without some of these specific details. In other instances, well-known features are omitted or simplified in order not to obscure the present invention.

The description will be presented in terms of operations performed by a processor based device consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are synonymous.

Figure 1:
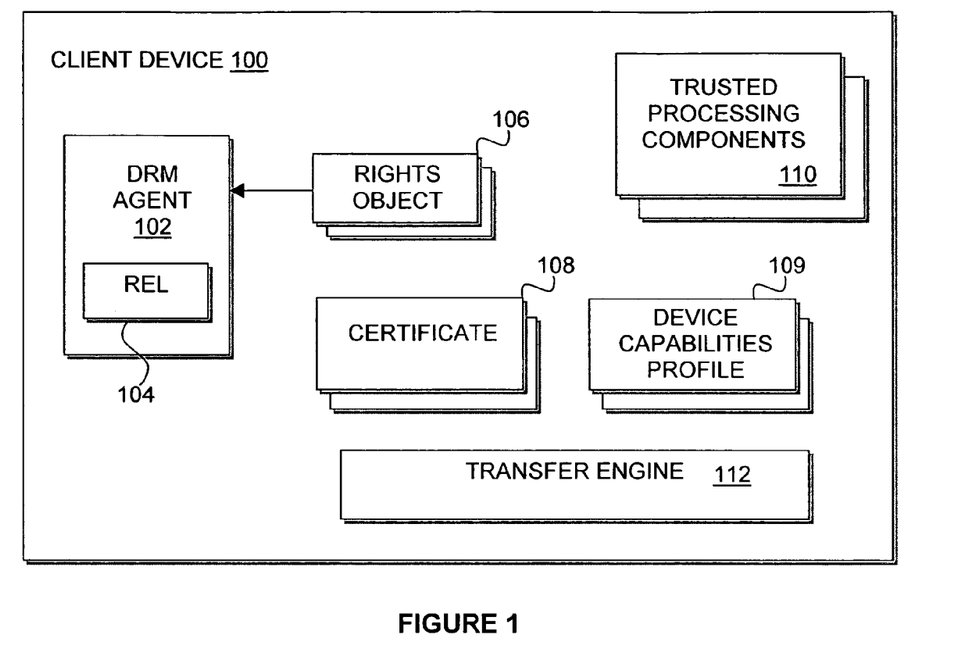
FIG. 1 illustrates an example client device equipped to facilitate transcoding of secure content objects in accordance with one embodiment of the invention.

FIG. 1 illustrates an example client device 100 equipped with digital rights management (DRM) agent 102 and transfer engine 112 to facilitate transcoding of secure content objects. The terms "client device" and "playback device" are intended to represent a broad range of digital systems capable of rendering content objects. Such system include devices such as wireless mobile phones, palm sized personal digital assistants, and other general purpose or dedicated portable player devices, notebook computers, desktop computers, set-top boxes, game consoles, and so forth. Moreover, usage of the term "content object" is intended to broadly refer to a digital resource such as, but not limited to an audio and/or video clip (including motion video and still images), a data file or stream, a ringing tone, a screen saver, a Java applet or any other digital resource, whether alone or combined.

Transfer engine 112 is equipped to identify whether a receiving device, through which a particular content object may be rendered, supports the current format of the content object. In one embodiment, transfer engine 112 may perform various functions such as dynamic and secure content conversion and/or transfer in coordination with DRM agent 102 and one or more of trusted processing components 110. In one embodiment, DRM agent 102 facilitates performance of indicated actions by transfer engine 112 based in part upon the presence or absence of a corresponding rights object 106. Such actions may include, but are not limited to the transfer of secure content and/or device keys to one or multiple playback devices, the conversion of a content object into other DRM, file, or CODEC formats, the burning or copying of a content object onto a media storage device, and so forth. Media storage may refer to any medium where content objects can be stored. Examples of media storage may include, but are not limited to, a hard drive, a CDR/DVD disk, compact flash cards, OpenMG memory sticks, SD audio cards, portable content players, personal digital assistants, file servers, and so forth.

Each of rights objects 106 of FIG. 1 are intended to represent an instance of rights that define or otherwise represent consumption rules stated in terms of a rights expression language for a particular content object or class of content objects. Rights refer to permissions and constraints that define under which circumstances access may be granted to DRM content. In one embodiment, rights objects are expressed in terms of a rights expression language (REL), such as REL 104, corresponding to a particular DRM implementation. In one embodiment, rights objects may represent one or more digital licenses, however other rights instantiations are possible. In one embodiment, rights objects are provided in encrypted form by rights issuers, where a rights issuer may represent an entity such as a content producer, or a device such as a license server operated by such an entity.

In one embodiment, before a given action is performed, a determination may be made by client device 100 as to whether the client device is authorized to perform the action based upon the existence or non-existence of a rights object authorizing performance of such action. In one embodiment, client device 100 may request an appropriate rights object from a rights issuer if necessary to facilitate performance of the action. Similarly, client device 100 may obtain one or more additional secure components to perform an action. In one embodiment, the secure components may be obtained/received from the provider of the content object (e.g. content provider) or from a third party.

In one embodiment, client device 100 may identify capabilities of a receiving device via capabilities profile 109. In one embodiment, one or more device capabilities profiles 109 may be provided to client device 100 from receiving devices. Alternatively, device capabilities profiles 109 may be downloaded by client device 100 as needed from a variety of sources or pre-installed on client device 100.

As an alternative to capabilities profile 109, transfer engine 112 may utilize one or more of digital certificates 108 to facilitate performance of an indicated action. Digital certificate 108 may identify one or more trusted processing components 110 to facilitate performance of the action identified by the certificate.

In one embodiment, each secure component is associated with a unique identifier which is used by digital certificate 108 to identify the appropriate ones of secure components 110 to perform an indicated action. In another embodiment, DRM agent 102 may receive an indication in the form of an action identifier, such as an action name or action type, identifying the action to be performed. Upon receiving the indication of the action to be performed. DRM agent 102 may identify (e.g. based upon the action identifier) a digital certificate 108.

In one embodiment, digital certificate 108 may identify an order with which indicated trusted processing components 110 are to be executed in connection with performance of the indicated action. Additional information regarding certificate-based processing of content objects may be found in U.S. patent application Ser. No. 10/736,451 entitled "CERTIFICATE BASED DIGITAL RIGHTS MANAGEMENT", now U.S. Pat. No. 7,185,195, the contents of which are hereby incorporated by reference.

In accordance with one embodiment of the invention, DRM agent 102 is implemented in tamper resistant code on client device 100. Building from this root point of trust, it is possible for the client device to authenticate the various trusted processing components that may provide elemental functions associated with a desired action such as transcoding. In one embodiment, client device 100 may authenticate trusted processing components 110 by validating corresponding digital signatures associated with each processing component.

For example, in the event a secure content object is to be transcoded from a first encoding algorithm to a second encoding algorithm, client device 100 (by way of transfer engine 112) may utilize a number of trusted processing components 110 to achieve a desired output format. More specifically, client 100 may utilize a decryptor element to first decrypt the content object, a decoder element to decode the content object, an encoder element to re-encode the content object using a different CODEC than that of the input format, and an encryptor element to re-encrypt the content object (e.g., with the same or different DRM system).

In accordance with one embodiment of the invention, DRM agent 102 may first validate its own digital signature to ensure its own code has not been tampered with. Thereafter, DRM 102 may proceed to validate the digital signature of the first trusted processing component in an array of trusted components. In the event the content object is a secure content object, the first trusted processing component may typically be a decoder. In that case, DRM 102 may proceed to validate the digital signature associated with a decryptor processing component. Assuming the decryptor processing component is properly authenticated and no tampering is detected, the decryptor processing component may then decrypt the secure content object. However, before the decryptor processing component passes the decrypted data to the decoder processing component (or any other processing component for that matter), the decryptor validates the signature of the decoder processing component to ensure that it was not tampered with and is therefore secure. In accordance with one embodiment of the invention, this process of component authentication continues until data associated with the content object is again encrypted by the encryptor processing component. By verifying the authenticity of each trusted processing component, it is possible to pass non-encrypted data through a series of components in a secure manner.

Trusted processing components 110 may be designed to operate in conjunction with other components to perform compound or multi-part functions, or to operate autonomously to perform particular elemental functions. For example, a selected one of processing components 110 may simply operate to write a content object such as a digital audio track out to a data file in pulse-code modulated (PCM) format. Alternatively, multiple ones of processing components 110 may operate together as part of a combined component chain used to transcode a particular content object from one manifestation (as e.g. defined by a file format, CODEC, CODEC bitrate, interleaving method, sampling rate, color format, and DRM type), to another.

The term "processing component" or simply "component", is intended to broadly refer to logic embodied in hardware or firmware, or to a collection of software instructions, possibly having entry and exit points, written in a programming language, such as, for example, C++. A "trusted" processing component generally is a component that has had all code paths carefully examined to ensure that it behaves appropriately and has been signed to prevent further modification of those inspected secure code paths. A processing component may be compiled and linked into an executable program, or installed in a dynamic link library, or may be written in an interpretive language. It will be appreciated that processing components may be callable from other components or from themselves, and/or may be invoked in response to detected events or interrupts. Software instructions may be embedded in firmware, such as an EPROM. It will be further appreciated that hardware components may be comprised of connected logic units, such as gates and flip-flops, and/or may be comprised of programmable units, such as programmable gate arrays or processors. In one embodiment, the processing components described herein are implemented as software components, but may nonetheless be represented in hardware or firmware in other embodiments.

Figure 2:
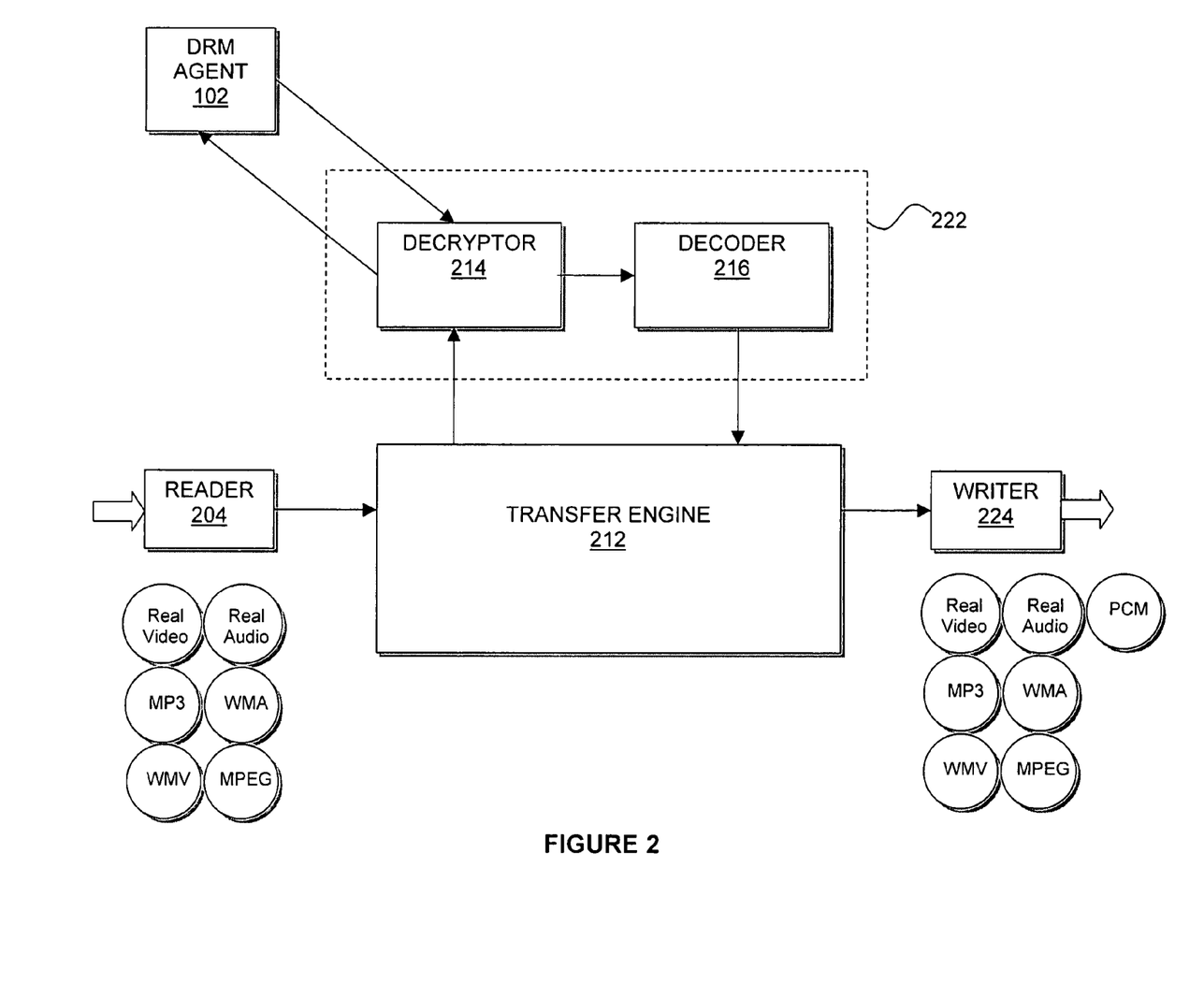
FIG. 2 illustrates a logical view of client 100 in accordance with one embodiment of the invention.

FIG. 2 illustrates a logical view of client 100 in accordance with one embodiment of the invention. In one embodiment, file reader 204 represents a component equipped to identify a wide variety of file formats, encoding formats, and encryption formats associated with content objects. For example, file reader 204 may identify a given content object as being a RealMedia type file, an MP3 type file, a WMA type file, WMV type file, and so forth. File reader 204 may identify a file type based upon a filename extension for the content object or information such as a Mime type received in association with the content object. File writer 224 represents a component equipped to store content objects and transcoded content in a variety of output file formats such as RealMedia, MP3, WMA, WMV, PCM and so forth. Although client 100 is shown having one file reader and one file writer to handle all file formats, client 100 may instead be equipped with separate file readers and file writers for each available file format.

In one embodiment, file reader 204 may further identify whether the content object is associated with a particular DRM and thus considered to be secure content. For example, the content object may contain a header indicating that the content object is encrypted in accordance with particular DRM. If so, transfer engine 212 may automatically recognize that appropriate rights-objects are needed to perform actions on the content object.

In one embodiment, once file reader 204 has determined a file format, encoding format, and potential encryption format, transfer engine may compare these values with those identified in a device capabilities profile (109 of FIG. 1) associated with a device to which a transcoded content object may be transferred. Based upon the results of such a comparison, transfer engine 212 may dynamically identify appropriate ones of trusted processing components 110 to facilitate transcoding of the content object from an identified input format to a determined output format.

For example, assume transfer engine 212 supports an action named Burn-to-CD which would provide for a content object to be converted to a PCM data format without an encoding, encryption or even an output file format specified. If the content object is secure (e.g. encrypted), file reader 204 will recognize such and in turn load decryptor 214. Since the content object will need to be decoded (as it is a Burn-to-CD action), decryptor 214 communicates with DRM agent 102, which determines whether decryptor 214 has appropriate rights to perform the Burn-to-CD action. In one embodiment, DRM agent 102 authenticates decryptor 214 by validating its digital signature and determining if the appropriate rights object exists to authorize such an action by decryptor 214. Upon DRM 102 determining that decryptor 214 is authorized to perform the action, decryptor 214 may decrypt the content object data at which point it could be vulnerable to attack. However, in accordance with embodiments of the present invention, decryptor 214 may proceed to validate the signature of decoder 216 to ensure it is a trusted component. If it is a trusted component, decryptor 214 will pass chunks of data to decoder 216 for decoding. Thereafter, as file reader 204 receives packets of data associated with the content object, decryptor 214 and decoder 216 may process chunks of data until the action is complete. In one embodiment, decryptor 214 may validate the signature of decoder 216 each time it attempts to pass data to the decoder, or only a subset of times it attempts to pass data.

Although only two processing components are depicted in component chain 222 of FIG. 2, other trusted components may nonetheless be used. For example, depending upon the action to be performed, an encoder component and a encryptor component may also be used. Furthermore, additional trusted processing components may include, but are not limited to interleaver and deinterleaver functions to add or remove interleaving, resampling functions to change the sampling rate, number of channels, and/or bits per sample of audio data, and color conversion and resize functions to respectively change the color format and height/width of video data.

Figure 3:
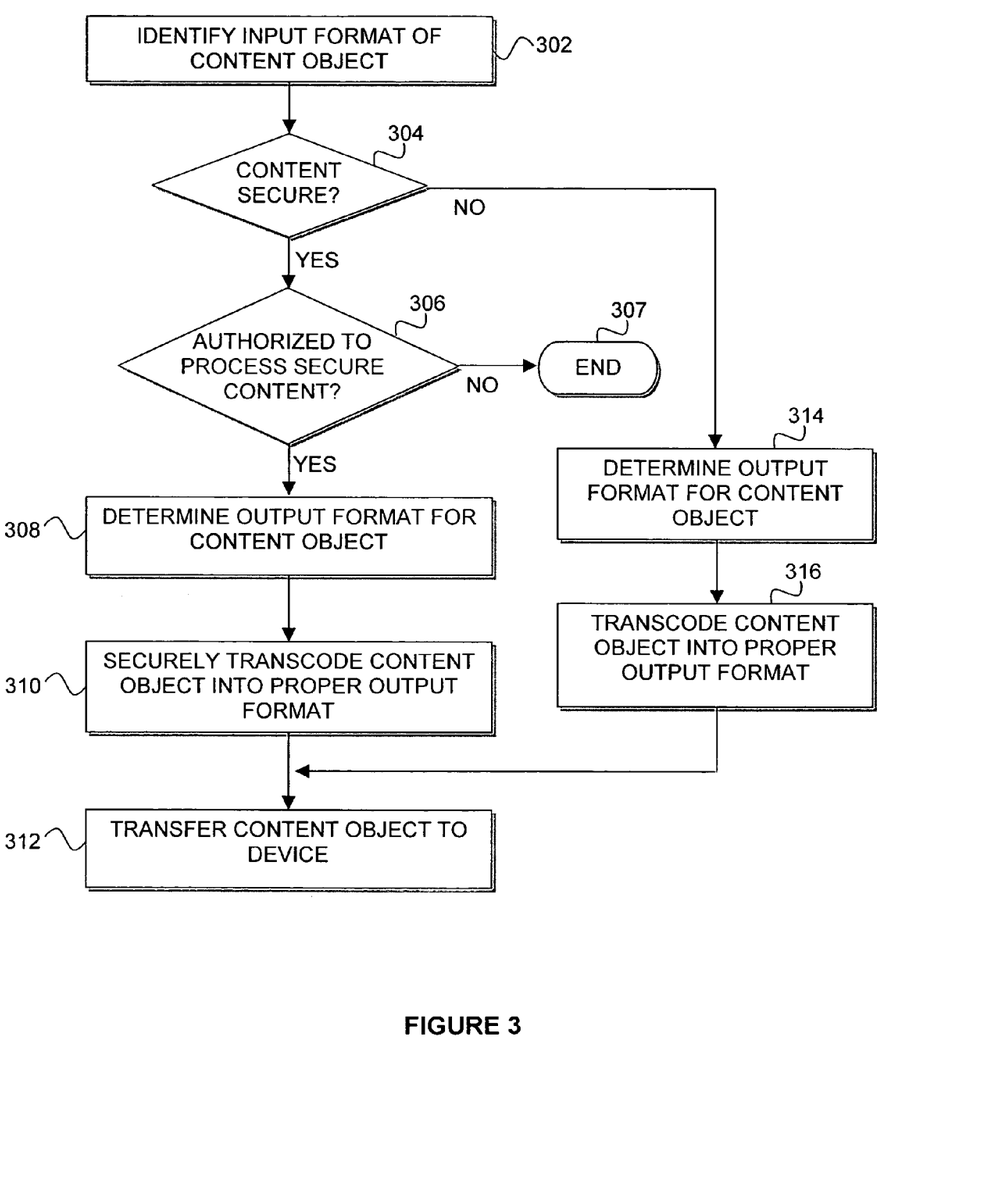
FIG. 3 illustrates an example operational flow of a transcoding operation performed by client device 100 in accordance with one embodiment of the invention.

FIG. 3 illustrates an example operational flow of a transcoding operation performed by client device 100 in accordance with one embodiment of the invention. In the illustrated embodiment, the process begins with the file reader identifying an input format of a content object at block 302. At block 304, a determination is made as to whether the content is secure. If the content object is not secure, an output format is determined for the content object based upon capabilities of a receiving device at block 314. At block 316, the content is transcoded from the identified input format to the determined output format. Thereafter, at block 312, the transcoded content object may be transferred to the receiving device. However, if at block 304 a determination is made that the content is secure, a further determination may be made at block 306 as to whether the client is authorized to process the secure content in any manner. If the client device is not authorized to process the content object, the process ends at block 307. However, if the client device is authorized to process the content object, an output format for the content object is determined at block 308. In one embodiment, the output format is determined based upon capabilities of a receiving device to which the content object is to be transferred. At block 310, the content object is securely transcoded from the identified input format to the determined output format. Thereafter, the content object may be transferred to the receiving device in the new output format.

Figure 4:
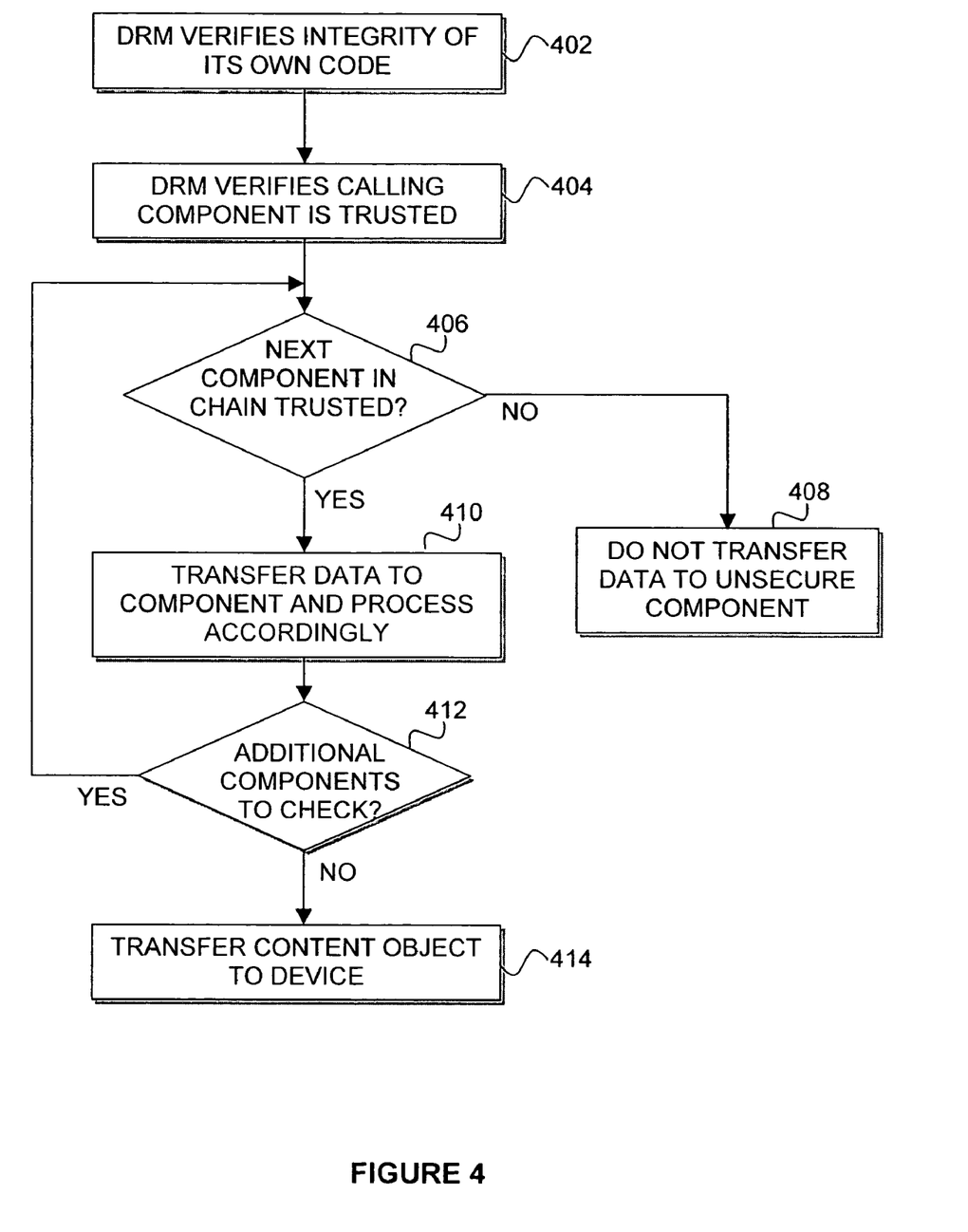
FIG. 4 illustrates an example operational flow for a secure transcoding operation performed by client device 100 in accordance with one embodiment of the invention.

FIG. 4 illustrates an example operational flow for a secure transcoding operation performed by client device 100 in accordance with one embodiment of the invention. In the illustrated embodiment, the process begins at block 402 where DRM agent 102 verifies the integrity of its own code. In one embodiment, DRM agent 102 may validate a digital signature associated with a secure code segment implementing the DRM. Assuming the DRM proves to not have been tampered with, the DRM may then verify that the calling component is a trusted component at block 404. In one embodiment, DRM agent 102 may validate a digital signature associated with a processing component such as decryptor 214. Assuming the calling component proves to be trusted, a determination is then made at block 406 as to whether the next component in the component chain (e.g. 222 of FIG. 2) is also trusted. If not, the content object is not passed to the next component, nor is it processed any further as a secure environment cannot be guaranteed, block 408. However, if the next component in the component chain is also trusted, data associated with the content object is transferred to the next component where it is processed accordingly, block 410. At block 412, a further determination is made as to whether any additional components remain in the component chain. If so, the process loops to block 406 where a determination is made as to whether the next component is trusted. However, if at block 412 it is determined that no additional components exist in the chain, the content object may be transferred to a receiving device at block 414.

Figure 5:
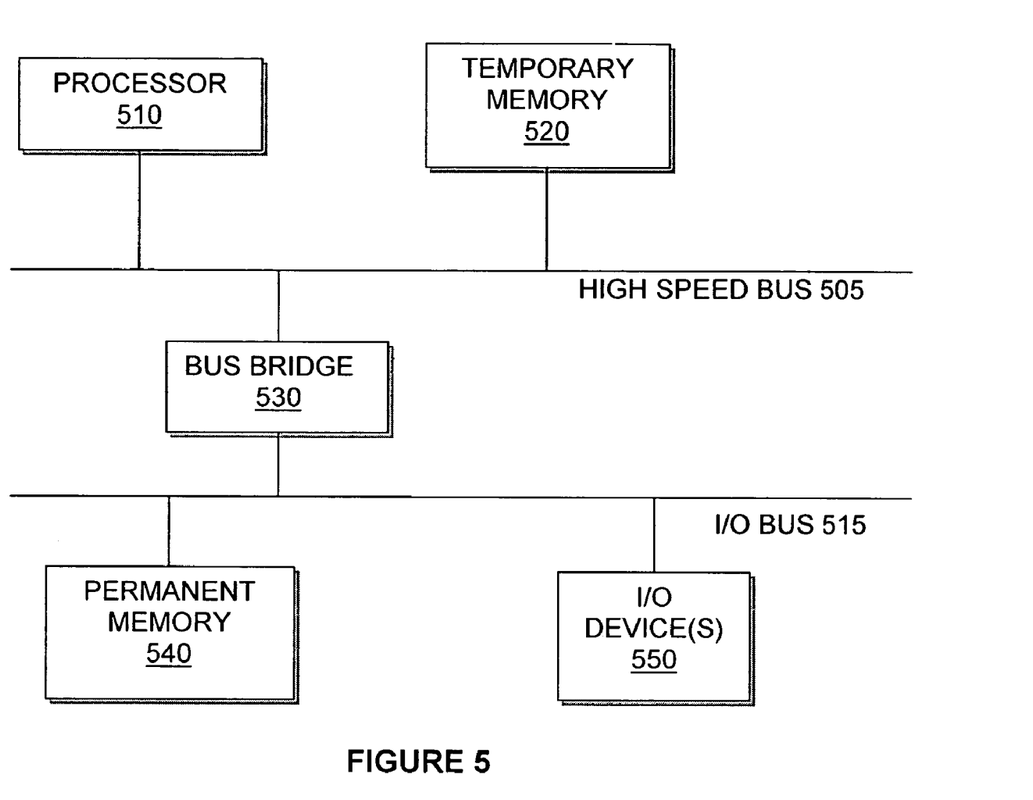
FIG. 5 illustrates one embodiment of a generic hardware system.

FIG. 5 illustrates one embodiment of a generic hardware system suitable for use as client device 100 incorporated with the teachings of the present invention. In the illustrated embodiment, the hardware system includes processor 510 coupled to high speed bus 505, which is coupled to input/output (I/O) bus 515 through bus bridge 530. Temporary memory 520 is coupled to bus 505, while permanent memory 540 and I/O device(s) 550 are coupled to bus 515. I/O device(s) 550 may include a display device, a keyboard, one or more external network interfaces, etc.

Certain embodiments may include additional components, may not require all of the above components, or may combine one or more components. For instance, temporary memory 520 may be on-chip with processor 510. Alternately, permanent memory 540 may be eliminated and temporary memory 520 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

In one embodiment, the hardware system of FIG. 5 operating as client device 100 may be coupled to a local area network (LAN), an internet protocol (IP) network, etc. For example, client device 100 may be communicatively coupled to a rights issuer and/or content provider via a shared network. In one embodiment, the present invention as described above may be implemented as software routines executed by one or more execution units within a computing device. For a given computing device, the software routines can be stored on a storage device, such as permanent memory 540.

Figure 6:
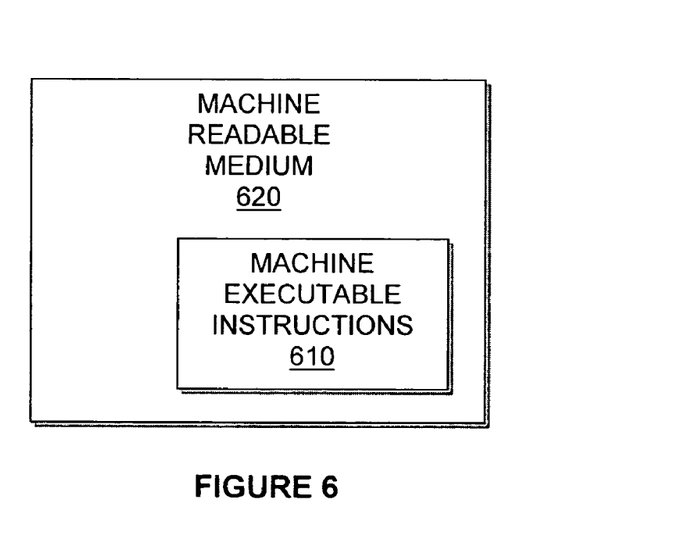
FIG. 6 illustrates one embodiment of a machine-readable medium to store executable instructions for embodiments of the present invention.

Alternately, as shown in FIG. 6, the software routines can be machine executable instructions 610 stored using any machine readable storage medium 620, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 550 of FIG. 5.

From whatever source, the instructions may be copied from the storage device into temporary memory 520 and then accessed and executed by processor 510. In one implementation, these software routines may be written in the C programming language. It is to be appreciated, however, that these routines may be implemented in any of a wide variety of programming languages.

In alternate embodiments, the present invention as described above may be implemented in discrete hardware or firmware. For example, one or more application specific integrated circuits (ASICs) could be programmed with one or more of the above-described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

While embodiments of the present invention have been described in terms of the foregoing embodiments, those skilled in the art will recognize that the invention is not limited to the embodiments described. Other embodiments can be practiced with modification and alteration within the spirit and scope of the appended claims. Thus, the description is to be regarded as illustrative instead of restrictive.

What is claimed is:

1. In a content playback device capable of locally playing back content and equipped with a digital rights management agent, a method of transcoding a secure content object, the method comprising:
   identifying an input format of the secure content object;
   identifying capabilities of a receiving playback device to which the secure content object is to be transferred via a communication with the receiving playback device;
   determining an output format for the secure content object based upon the identified capabilities;
   identifying, using a digital certificate, a plurality of trusted processing components to collectively transcode the secure content object from the identified input format to the determined output format, wherein each of said plurality of trusted processing components is associated with a corresponding unique identifier and said digital certificate includes unique identifiers corresponding to each of the plurality of trusted processing components;
   authenticating each of the trusted processing components using said associated corresponding unique identifiers prior to the respective processing component operating on the secure content object; and
   causing a change in a memory to indicate that each of the trusted components has been authenticated.

2. The method of claim 1, wherein the digital rights management agent is implemented in secure programming code such that the secure programming code prevents non-trusted parties from tampering with the secure programming code.

3. The method of claim 2, wherein the digital rights management agent is secured through at least one of obfuscation, encryption of programming code using symmetric encryption or asymmetric encryption by a public key, anti static analysis, and anti-dynamic analysis.

4. The method of claim 2, further comprising authenticating the digital rights management agent, wherein a digital signature of the digital rights management agent programming code is validated.

5. The method of claim 4, wherein authenticating each of the trusted processing components comprises validating a digital signature of programming code associated with implementation of each respective processing component.

6. The method of claim 5, wherein the digital rights management agent authenticates itself and a decryptor processing component.

7. The method of claim 1, further comprising:
   determining whether the content playback device is authorized to process the secure content object; and
   obtaining an appropriate rights object authorizing the content playback device to process the secure content object if it is not determined to be authorized.

8. The method of claim 1, wherein the input format is determined by information stored in one or more packet headers.

9. The method of claim 1, wherein the input format is determined by a file extension associated with the secure content object.

10. The method of claim 1, wherein the capabilities are determined based upon a device capabilities profile associated with the receiving playback device.

11. The method of claim 1, wherein the receiving playback device comprises a portable playback device.

12. The method of claim 1, wherein the receiving playback device comprises a non-volatile storage device.

13. In a content playback device capable of locally playing back content and equipped with a digital rights management agent, a method of authorizing performance of an action on a secure content object, the method comprising:
    identifying an input format of the secure content object;
    determining an output format for the secure content object based upon the action to be performed via a communication with a specific receiving payback device;
    identifying, using a digital certificate, a plurality of trusted processing components to collectively perform the action the secure content object, wherein each of said plurality of trusted processing components is associated with a corresponding unique identifier and said digital certificate includes unique identifiers corresponding to each of the plurality of trusted processing components;
    authenticating each of the trusted processing components using said associated corresponding unique identifiers prior to the respective processing component operating on the secure content object; and
    causing a change in a memory to indicate that each of the trusted components has been authenticated.

14. The method of claim 13, wherein the digital rights management agent is implemented in secure programming code such that the secure programming code prevents non-trusted parties from tampering with the secure programming code.

15. The method of claim 14, wherein the digital rights management agent is secured through at least one of obfuscation, encryption of programming code using symmetric encryption or asymmetric encryption by a public key, anti static analysis, and anti-dynamic analysis.

16. The method of claim 14, further comprising authenticating the digital rights management agent, wherein a digital signature of the digital rights management agent programming code is validated.

17. The method of claim 16, wherein authenticating each of the trusted processing components comprises validating a digital signature of programming code associated with implementation of each respective processing component.

18. The method of claim 17, wherein the digital rights management agent authenticates itself and a decryptor processing component.

19. The method of claim 13, further comprising:
    determining whether the playback device is authorized to process the secure content object; and
    obtaining an appropriate rights object authorizing the playback device to process the secure content object if it is not determined to be authorized.

20. The method of claim 13, wherein the input format is determined by information stored in one or more packet headers.

21. The method of claim 13, wherein the input format is determined by a file extension associated with the secure content object.

22. The method of claim 13, wherein the capabilities are determined based upon a device capabilities profile associated with the receiving playback device.

23. The method of claim 13, wherein the receiving playback device comprises a portable playback device.

24. The method of claim 1, wherein the receiving playback device comprises a non-volatile storage device.

25. A machine readable medium having stored thereon machine executable instructions, which when executed by a content playback device capable of locally playing back content and equipped with a digital rights management system, operable to implement a method comprising:
    identifying an input format of the secure content object;
    identifying capabilities of a receiving playback device to which the secure content object is to be transferred via a communication with the receiving playback device;
    determining an output format for the secure content object based upon the identified capabilities;
    identifying, using a digital certificate, a plurality of trusted processing components to collectively transcode the secure content object from the identified input format to the determined output format, wherein each of said plurality of trusted processing components is associated with a corresponding unique identifier and said digital certificate includes unique identifiers corresponding to each of the plurality of trusted processing components;
    authenticating each of the trusted processing components using said associated corresponding unique identifiers prior to the respective processing component operating on the secure content object; and
    causing a change in a memory to indicate that each of the trusted components has been authenticated.

26. The method of claim 25, wherein the digital rights management agent is implemented in secure programming code such that the secure programming code prevents non-trusted parties from tampering with the secure programming code.

27. The method of claim 26, wherein the digital rights management agent is secured through at least one of obfuscation, encryption of programming code using symmetric encryption or asymmetric encryption by a public key, anti static analysis, and anti-dynamic analysis.

28. The method of claim 26, further comprising authenticating the digital rights management agent, wherein a digital signature of the digital rights management agent programming code is validated.

29. The method of claim 28, wherein authenticating each of the trusted processing components comprises validating a digital signature of programming code associated with implementation of each respective processing component.

30. The method of claim 29, wherein the digital rights management agent authenticates itself and a decryptor processing component.

31. A machine readable medium having stored thereon machine executable instructions, which when executed by a content playback device capable of locally playing back content and equipped with a digital rights management system, operable to implement a method comprising:
    identifying an input format of the secure content object;
    determining an output format for the secure content object based upon the action to be performed via a communication with a specific receiving playback device;
    validating that the playback device possesses sufficient rights to perform the action;
    identifying, using a digital certificate, a plurality of trusted processing components to collectively perform the action on the secure content object wherein each of said plurality of trusted processing components is associated with a corresponding unique identifier and said digital certificate includes unique identifiers corresponding to each of the plurality of trusted processing components;

authenticating each of the trusted processing components using said associated corresponding unique identifiers prior to the respective processing component operating on the secure content object; and causing a change in a memory to indicate that each of the trusted components has been authenticated.

32. The method of claim 31, wherein the digital rights management agent is implemented in secure programming code such that the secure programming code prevents non-trusted parties from tampering with the secure programming code.

33. The method of claim 32, wherein the digital rights management agent is secured through at least one of obfuscation, encryption of programming code using symmetric encryption or asymmetric encryption by a public key, anti static analysis, and anti-dynamic analysis.

34. The method of claim 32, further comprising authenticating the digital rights management agent, wherein a digital signature of the digital rights management agent programming code is validated.

35. The method of claim 34, wherein authenticating each of the trusted processing components comprises validating a digital signature of programming code associated with implementation of each respective processing component.

36. The method of claim 35, wherein the digital rights management agent authenticates itself and a decryptor processing component.

37. The method of claim 1, wherein identifying, using said digital certificate, said plurality of trusted processing components includes receiving an indication of an action identifier associated with said digital certificate, said action identifier identifying a transcoding action to be performed.

38. The method of claim 13, wherein identifying, using said digital certificate, said plurality of trusted processing components includes receiving an indication of an action identifier associated with said digital certificate, said action identifier identifying a transcoding action to be performed.

39. The machine readable medium of claim 25, wherein identifying, using said digital certificate, said plurality of trusted processing components includes receiving an indication of an action identifier associated with said digital certificate, said action identifier identifying a transcoding action to be performed.

40. The machine readable medium of claim 31, wherein identifying, using said digital certificate, said plurality of trusted processing components includes receiving an indication of an action identifier associated with said digital certificate, said action identifier identifying a transcoding action to be performed.

* * * * *

UNITED STATES PATENT AND TRADEMARK OFFICE
CERTIFICATE OF CORRECTION

| | |
|---|---|
| PATENT NO. | : 7,721,111 B2 |
| APPLICATION NO. | : 10/736219 |
| DATED | : May 18, 2010 |
| INVENTOR(S) | : Joshua D. Hug and Xiaodong Fu |

It is certified that error appears in the above-identified patent and that said Letters Patent is hereby corrected as shown below:

Column 9, line 18, "cation with a specific receiving payback device" should be changed to
-- cation with a specific receiving playback device --

Column 10, line 3, "24. The method of claim 1, wherein the receiving playback" should be changed to
-- 24. The method of claim 13, wherein the receiving playback --

Signed and Sealed this
Fifth Day of June, 2012

David J. Kappos
*Director of the United States Patent and Trademark Office*